April 30, 1940. N. TITLESTAD 2,198,795
TRAY TYPE SULPHURIC ACID CONVERTER
Filed Jan. 26, 1938 2 Sheets-Sheet 1

INVENTOR
NICOLAY TITLESTAD,
BY Wm. P. Spielman
ATTORNEY.

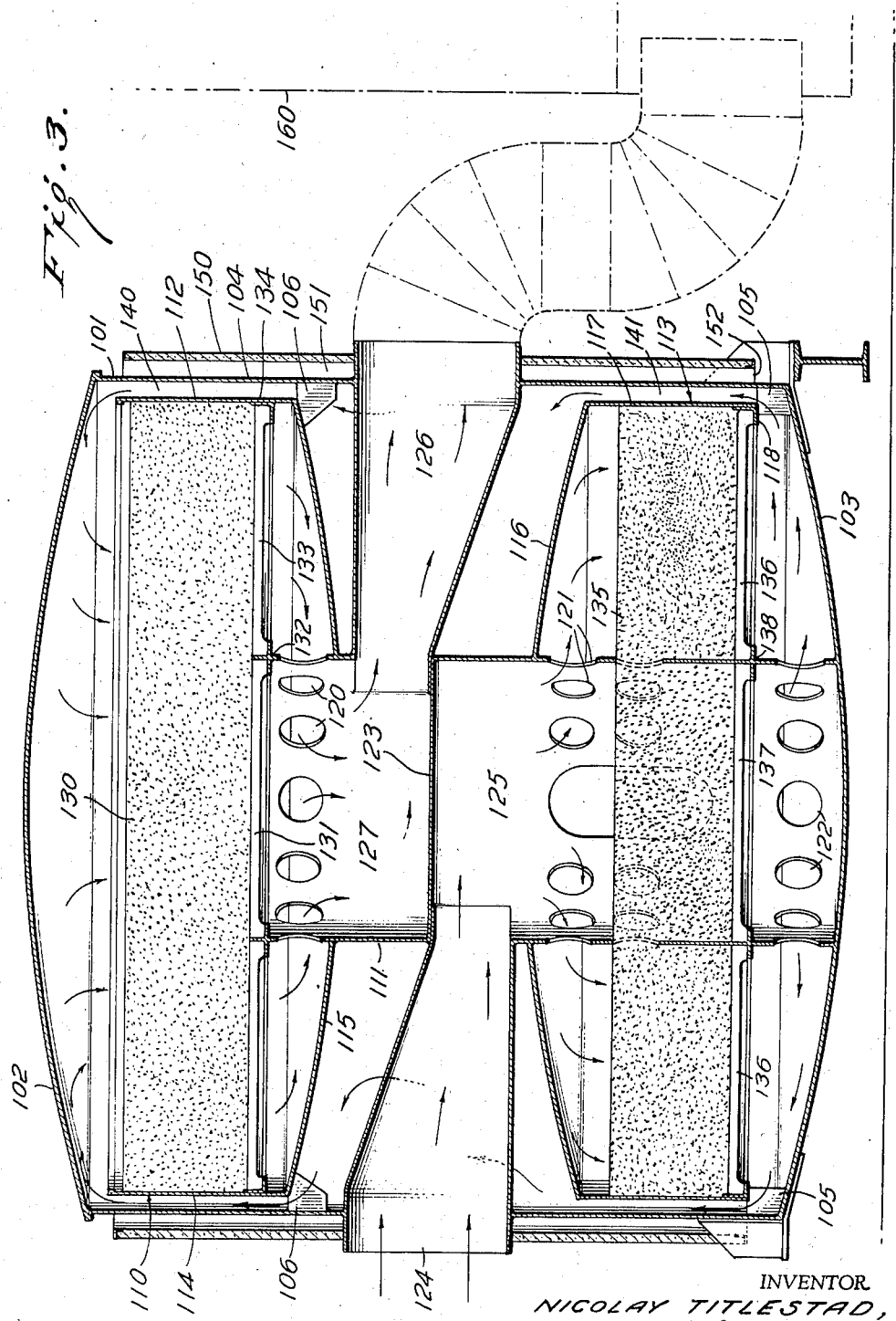

Patented Apr. 30, 1940

2,198,795

UNITED STATES PATENT OFFICE 2,198,795

TRAY TYPE SULPHURIC ACID CONVERTER

Nicolay Titlestad, White Plains, N. Y., assignor to Chemical Construction Corporation, New York, N. Y., a corporation of Delaware Application January 26, 1938, Serial No. 186,939

8 Claims. (Cl. 23—288)

This invention relates to catalytic converters for exothermic vapor phase reactions, and more particularly to a modified layer or tray type converter for the vapor phase oxidation of sulphur dioxide to sulphur trioxide, which is used in the contact sulphuric acid process.

It has been standard practice for many years in such plants to pass mixtures of sulphur dioxide and air through a series of layers of platinum catalyst and to provide intercooling between each layer to remove the heat generated by the reaction. The present invention deals with converters or converter systems of this type, but which are especially designed for large capacity plants using a highly active vanadium catalyst instead of the platinum catalyst that has been standard in the older processes for many years.

One of the principal objects of the invention is to provide a converter for vapor phase catalytic reactions in which a uniform temperature is maintained throughout the catalyst layer in a direction at right-angles to the direction of gas flow. A further object is the provision of intercooling between the stages by a type of intercooler which does not increase the size or cost of the converter. A still further object is the provision of a type of converter capable of construction in unusually large sizes which will not become warped or distorted under the high temperatures at which such converters are run. Still another object is the provision of a converter which is cheap and simple in construction, easy to clean and repair, and capable of producing high percentage yields and a large output per unit volume of converter space.

With the above and other objects in view, the converter consists essentially of an outer converter shell loosely containing an inner catalyst basket which is so mounted as to provide an annular gas space adjacent the side walls of the converter shell. Upper and lower catalyst layers are supported within the catalyst basket, with or without additional intermediate layers, and the incoming reaction gas mixture is caused to pass downwardly through the lower catalyst layer, then up through the annular space between the catalyst basket and the converter shell and then downwardly through the upper catalyst layer. It is also possible to pass the gases through the converter in the opposite direction without departing from the scope of the invention. By this provision the sides of the catalyst layers are insulated in such a manner that a uniform horizontal temperature is maintained, while the passage of the reaction gases downwardly through the two or more catalyst layers automatically sets up and maintains therein the temperature gradient which is necessary for optimum percentage conversion.

The invention will be described in greater detail with reference to the accompanying drawings which illustrate specific modifications thereof and in which the same reference numerals designate the same or similar parts. In these drawings:

Fig. 3 is a vertical section through a converter representing a modified form of the invention which is adapted for a side inlet and outlet of the gases.

Figure 1:
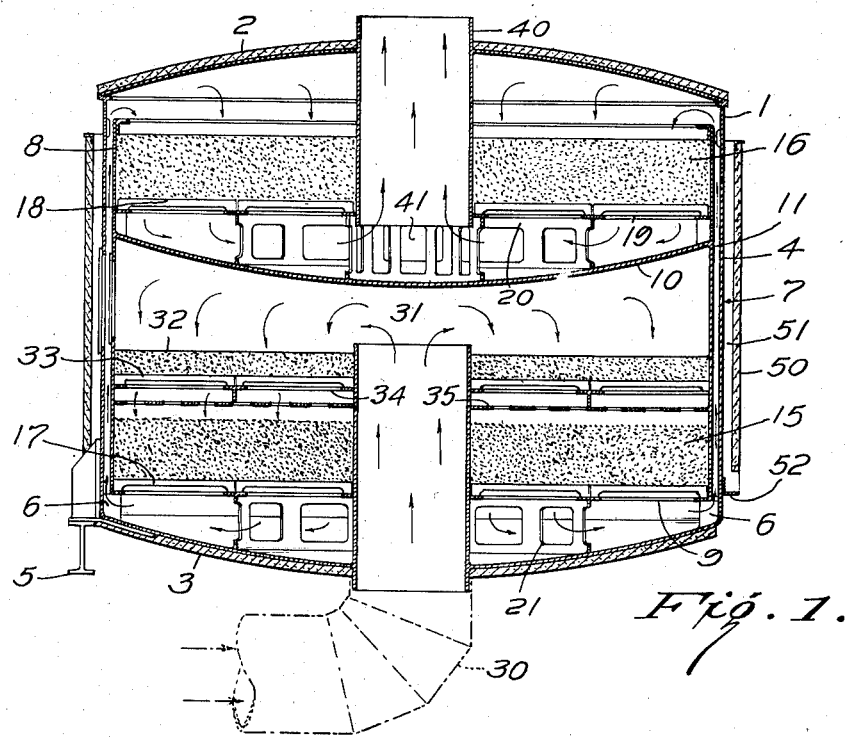
Fig. 1 is a vertical section through the primary converter of a two-converter system constituting an embodiment of the invention.
Figure 2:
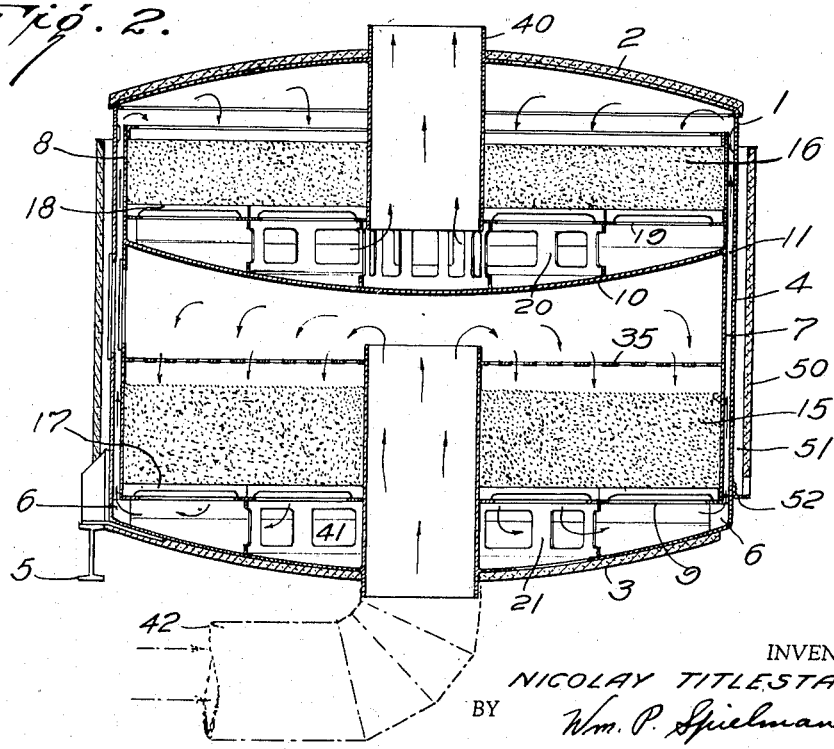
Fig. 2 is a similar vertical section through the secondary converter of this system.

A comparison of Figs. 1 and 2 will show that they are substantially the same in construction, and accordingly the same reference numerals will be used in their description. With this in mind, the converter of Figs. 1 and 2 comprises an outer converter shell 1 having insulated top and bottom pieces 2 and 3 and cylindrical sides 4 which are uninsulated. The bottom piece 3 rests on supports 5, only one of which is illustrated in the drawings, and the inner structure of the converters in turn rests on these bottom pieces.

Within the converter shell 1 and welded or otherwise attached to the bottom piece 3 are a number of supports or brackets 6 on which rests a catalyst basket 7. This basket consists of a vertical cylindrical side wall 8 which is slightly less in diameter than the side wall 4 of the converter shell, a perforated bottom frame 9 and a heavy gas-tight partition 10 across the central part thereof. The catalyst basket 7 is mounted concentrically with the side wall 4 of the converter shell 1 and thereby provides an annular gas passage 11 therebetween.

Within the catalyst basket are lower and upper catalyst layers 15 and 16, which layers are supported on a number of annular perforated grids 17 and 18. The lower grids 17 rest on the bottom frame 9 of the catalyst basket 7 while the upper grids 18 rest on a similar frame 19 which is likewise perforated to register with them. The weight of the catalyst mass, which in a large size converter may amount to several tons for each layer, is supported through the grids 18 and 17 by means of upper and lower supporting trusses 20 and 21, the lower truss 21 resting on the bottom piece 3 of the converter and the upper truss 20 resting on the heavy partition 10. Each of the trusses 20 and 21 is of openwork construction to permit the ready passage of gas through it.

The primary converter of Fig. 1 is provided with a lower gas inlet pipe 30 which passes thereinto axially through its bottom piece 3 and extends through the bottom frame 9 of the catalyst basket into a central zone 31 just below the partition 10. Within this zone is a layer 32 of filtering material, which is supported on annular grids 33 resting on a perforated plate 34 which is similar to the frame 19 and 9, but which is also attached to a perforated gas distributing plate 35 extending across the catalyst basket. An axial gas outlet pipe 40 leads from a space 41 below the upper catalyst layer 17 through the center of this catalyst layer and out through the top piece 2 of the converter shell, from which point it is connected by means of suitable piping and intercoolers to the inlet pipe 42 of the secondary converter illustrated in Fig. 2.

The secondary converter is identical in construction with that of the primary converter of Fig. 1, with the exception that the filter 32 and its supporting grid 33 and plate 34 are not used and the gas distributing plate 35 is simply attached to the side wall 8 of the catalyst basket. By reason of the omission of these elements, more room is provided for the lower catalyst layer 15, which is necessarily thicker because the reaction therein reaches equilibrium more slowly than in the primary converter.

Both the primary and secondary converters of Figs. 1 and 2 are surrounded by jackets 50, which are preferably adjustable and removable and which form with the cylindrical side walls 4 an air-duct 51 for maintaining a flow of cooling air along the converter shell. These jackets are preferably supported on brackets 52 attached to the lower side walls of the converter shell, and may be provided with dampers or other suitable means for controlling the flow of cooling air therethrough.

The operation of the converter is apparent from the arrows on the drawings, which indicate the direction of flow of the gases. A highly active vanadium contact mass, which is preferably a pelleted mass of the type described in U. S. Patent No. 1,896,320, is charged onto the lower and upper supporting grids of each of the catalyst baskets to a level such as is indicated on the drawings. The converter is brought up to reaction temperatures by the passage of hot gases therethrough, after which a 7–9% $SO_2$-air mixture is introduced at temperatures of approximately 380–430° C. into the inlet pipe 30 of the primary converter of Fig. 1. The gas is introduced through the pipe 30 into the central zone 31 between the gas-tight partition 10 and the filter 32, from which it passes downwardly through the filter and the lower catalyst layer, then outwardly and upwardly through the annular passage 11 between the catalyst basket and the converter shell, then downwardly through the upper catalyst layer 16 into the gas collecting space 41 and finally out through the outlet pipe 40 and into the gas intercoolers which are not shown.

During their travel up through the annular passage 11 the hot gases from the first catalyst layer 15 effectively insulate both the catalyst layers 15 and 16 from the heat losses in a horizontal direction, while at the same time they are effectively cooled by transfer of heat through the converter shell 4 to the cooling air passing within the air-duct 51. It will thus be seen that the present invention provides an intercooler in the form of an annular passage along the converter shell which serves the dual purpose of insulating the catalyst layers from radial heat losses and cooling the gases between catalyst stages, and which accomplishes these purposes without substantially increasing the size of the converter.

The gases from the intercooler are admitted to the central zone of the secondary converter of Fig. 2 through the inlet pipe 42 from which point they follow a similar path of travel downwardly through the lower catalyst layer 15, then upwardly through the annular passage 11 and then downwardly through the final or clean-up layer 16 and out through the outlet pipe 40 to suitable absorption towers for absorbing their $SO_3$ content in 98–99% sulphuric acid for the manufacture of sulphuric acid monohydrate or oleum. Accordingly, the secondary converter of Fig. 2 functions in a manner identical with that of Fig. 1 to provide a suitable intercooling between the catalyst layers and serves to insulate these layers from radial heat losses.

The embodiment of Fig. 3 contains all the advantages of the modification of Figs. 1 and 2, but is designed for side inlet and outlet of the gases in order to increase the effective area of the catalyst beds for a given size of converter. In the modification shown, the converter comprises a converter shell 101 with top and bottom pieces 102 and 103 and preferably cylindrical sides 104. The bottom piece 103 is provided with lower brackets or steps 105 and similar brackets 106 are attached to the upper part of the side walls 104.

A modified form of catalyst basket 110 is used in this converter, this basket consisting of a central gas receiving section 111 and upper and lower catalyst retaining sections 112 and 113 which are supported respectively on the brackets 106 and 105. The upper catalyst retaining section consists of a cylindrical side wall 114 and an imperforate bottom section 115 which is attached to the upper portion of the gas receiving section 111. The lower catalyst retaining section 113 consists of an upper imperforate top piece 116 which is also attached to the gas receiving section 111 and a cylindrical side wall 117 which terminates at its lower edge in an inturned flange 118.

The central gas receiving section 111 is a cylinder of sheet metal having perforations 120, 121 and 122 in its upper, intermediate, and lower parts and also having a gas-tight partition 123 between the upper and intermediate sets of perforations 120 and 121. A gas inlet pipe 124 provides communication from the exterior of the converter into the lower gas receiving spaces 125 below the partition 123, while a similar gas outlet pipe 126 extends from a gas discharge space 127 to the exterior of the converter.

The gas receiving section 111 is so constructed that it operates both as a gas conduit for the admission and discharge of gases to and from the catalyst and as a central pier for bracing and supporting the weight of both layers of catalyst. To this effect the upper catalyst layer 130 is supported in part on a central grid 131 which rests on the flanged top 132 of the gas receiving section 111 and in part on an annular grid 133 the inner edge of which rests on the flange 132 and the outer edge on a double flange 134 attached to the annular side wall 114 of the upper catalyst retaining section. Similarly, the lower catalyst layer 135 is supported by outer and central grids 136 and 137 which are supported by flanges 138 near the bottom of the gas receiving section 111 and in part by the flanges 118 above referred to.

The side walls 114 and 117 of the upper and lower catalyst receiving sections are slightly less in diameter than the side wall 104 of the converter shell, thereby providing upper and lower annular gas passages 140 and 141 which act as intercoolers similar to the annular passage 11 of Figs. 1 and 2. The converter shell is surrounded by a cylindrical jacket 150 which forms therewith an air-duct 151 for maintaining a flow of cooling air along the converter shell. This jacket is preferably supported on a flange or bracket 152 attached to the lower side wall of the converter shell, and is provided with dampers or other suitable means for controlling the flow of cooling air therethrough.

The arrows indicate the flow of the gases through the converter. The gases enter through the inlet pipe 124 into the gas receiving section 125 from which they are distributed over the lower catalyst layer 135 through the openings 121. The hot gases passing downwardly from the catalyst are by way of the openings 122 conducted through the lower annular gas passage 141 in intimate heat exchange relation with the converter shell, which is continuously cooled by a flow of air introduced in the air-duct 151. The gases then continue their upward flow through the upper annular pipe 140 and are finally distributed over and passed downwardly through the upper catalyst layer 130, where the reaction is completed. The reacted gases collect in the gas receiving space 127 and pass through the outlet pipe 126 to a gas cooler followed by an absorption tower, which apparatus is indicated diagrammatically at 160.

From the foregoing detailed description it will be seen that the objects of the invention are accomplished by the modifications illustrated. It is apparent, however, that variations and substitutions or equivalents may be resorted to within the scope of the invention. For example, a greater number of catalyst layers may be used in each converter or the direction of flow of the gases may be reversed. Accordingly, the invention is limited only by the scope of the claims annexed hereto.

What I claim is:

1. A converter for vapor phase catalytic reactions comprising in combination an inner catalyst basket, the side walls of which are imperforate, having a lower catalyst layer supported across the bottom and an upper catalyst layer supported near the top thereof, gas spaces at the bottom and the top respectively of said catalyst layers and in communication therewith, a gas tight partition across said basket between said catalyst layers, an outer converter shell loosely enclosing said basket, the basket and the inner walls of said converter shell defining a gas passageway in communication with the gas space at the bottom of the lower catalyst layer and the gas space at the top of the upper catalyst layer, an inlet for passage of a reaction gas mixture into and through the catalyst layer first in time, means for passing the hot reaction gas mixture therefrom through the passageway and into and through the other catalyst layer, and a jacket surrounding the side walls of said converter shell and forming therewith an air duct for maintaining a flow of cooling air along the converter shell.

2. A converter for vapor phase catalytic reactions comprising in combination a catalyst basket the side walls of which are imperforate having a lower catalyst layer supported across the bottom and an upper catalyst layer supported near the top thereof, a gas tight partition across said basket between said catalyst layers, a layer of filtering material between said partition and said lower catalyst layer, an outer converter shell loosely enclosing said basket, the basket and the inner walls of the converter shell defining a gas passageway in communication with the gas outlet at the bottom of the lower catalyst layer and the gas inlet at the top of the upper catalyst layer, an inlet for introducing a reaction gas mixture into the space between the filter and the partition, and for passage for it downwardly through the filter and the lower catalyst layer, and means for passing the hot reaction gas mixture therefrom upwardly through the passageway and into and downwardly through the upper catalyst layer.

3. A converter for vapor phase catalytic reactions comprising in combination a catalyst basket the side walls of which are imperforate having a lower catalyst layer supported across the bottom and an upper catalyst layer supported near the top thereof, a gas tight partition across said basket between said catalyst layers, an outer converter shell loosely enclosing said basket, means for passing a flow of cooling gas along the outer side walls of said converter shell, the basket and the inner walls of the converter shell defining a gas passageway in communication with the gas outlet at the bottom of the lower catalyst layer and the gas inlet at the top of the upper catalyst layer, an inlet for introducing a reaction gas mixture into the space between the lower catalyst layer and the partition, and for passage for it downwardly through the lower catalyst layer, and means for passing the hot reaction gas mixture therefrom upwardly through the passageway and into and downwardly through the upper catalyst layer.

4. A converter for vapor phase catalytic reactions comprising in combination a catalyst basket the side walls of which are imperforate having a lower catalyst layer supported across the bottom and an upper catalyst layer supported near the top thereof, a gas tight partition across said basket between said catalyst layers, an outer converter shell loosely enclosing said basket, a jacket surrounding the side walls of said converter shell and forming therewith an air duct for maintaining a flow of cooling air along the converter shell, the basket and the inner walls of the converter shell defining a gas passageway in communication with the gas outlet at the bottom of the lower catalyst layer and the gas inlet at the top of the upper catalyst layer, an inlet for introducing a reaction gas mixture into the space between the lower catalyst layer and the partition, and for passage for it downwardly through the lower catalyst layer, and means for passing the hot reaction gas mixture therefrom upwardly through the passageway and into and downwardly through the upper catalyst layer.

5. A converter for vapor phase catalytic reactions comprising in combination an inner catalyst basket the side walls of which are imperforate consisting of a central gas receiving section and upper and lower catalyst retaining sections, said gas receiving section being in gas communication with said catalyst sections, a gas tight partition across said gas receiving section, a converter shell loosely enclosing said basket, a gas inlet pipe extending through the side of said converter shell into the gas receiving section on one side of the partition, and a gas outlet pipe leading through the side of the converter shell from the gas receiving section on the other side of said partition.

6. A converter for vapor phase catalytic reactions comprising in combination an inner catalyst basket the side walls of which are imperforate and a converter shell loosely enclosing said catalyst basket, said catalyst basket consisting of upper and lower catalyst retaining sections and a central gas receiving section in the form of a perforated cylindrical pier which extends from within the upper catalyst retaining section to the bottom of the converter shell, and in gas communication with the catalyst retaining sections, catalyst supports in said upper and lower catalyst retaining sections resting on said gas receiving section, a gas tight partition across said gas receiving section, a gas inlet pipe leading into the gas receiving section on one side of the partition, and a gas outlet pipe leading out of the gas receiving section on the other side of said partition.

7. A method of temperature regulation in exothermic vapor phase catalytic reactions which comprises passing the gases to be reacted at reaction temperatures through lower and upper spaced apart, adjacently non-gas communicating catalyst layers, supported in an annular catalyst basket having imperforate side walls loosely enclosed by an outer converter shell, and maintaining a uniform temperature in the catalyst layers in a direction at right angles to the gas flow by passing the hot reaction gas mixture from the first catalyst layer through the annular passage defined by the adjacent side walls of the catalyst basket and the converter shell in a direction opposite to its direction of flow through the catalyst and thereby enveloping the side walls of both of the catalyst layers with said hot reaction gas mixture, then passing said gas mixture through the succeeding catalyst layer, and concurrently passing a stream of cooling gas over the exterior side walls of the converter shell, to cool the hot reaction gas mixture.

8. A method of temperature regulation in exothermic vapor phase catalytic reactions which comprises passing the gases to be reacted at reaction temperatures in sequence through lower and upper, spaced apart, annular catalyst layers, sealed adjacent against gas communication with each other, said catalyst layers being supported in a catalyst basket having imperforate side walls loosely enclosed by an outer converter shell, and maintaining a uniform temperature in the catalyst layers in a direction at right angles to the gas flow by passing the hot reaction gas mixture from the lower catalyst layer upwardly through the annular passage defined by the adjacent side walls of the catalyst basket and the converter shell, enveloping the side walls of both of the catalyst layers with said hot reaction gas mixture, then passing said gas mixture downwardly through the upper catalyst layer, and concurrently passing a stream of cooling gas along the exterior side walls of the converter shell to cool the hot reaction gas mixture.

NICOLAY TITLESTAD.

CERTIFICATE OF CORRECTION.

Patent No. 2,198,795. April 30, 1940.

NICOLAY TITLESTAD.

It is hereby certified that error appears in the printed specification of the above numbered patent requiring correction as follows: Page 3, second column, lines 6, 28, and 50, claims 2, 3, and 4 respectively, after the word and comma "thereof," insert --a gas outlet at the bottom of the lower catalyst layer, a gas inlet at the top of the upper catalyst layer,--; and that the said Letters Patent should be read with this correction therein that the same may conform to the record of the case in the Patent Office.

Signed and sealed this 4th day of June, A. D. 1940.

(Seal)

Henry Van Arsdale,
Acting Commissioner of Patents.